United States Patent [19]

Ortiz, Jr.

[11] Patent Number: 5,793,012
[45] Date of Patent: Aug. 11, 1998

[54] FRESNEL REFLECTION TERMINATION SYSTEM FOR HIGH POWERED LASER SYSTEMS

[75] Inventor: Angel Luis Ortiz, Jr., Saratoga Springs, N.Y.

[73] Assignee: General Electric Company, Schenectady, N.Y.

[21] Appl. No.: 511,849

[22] Filed: Aug. 7, 1995

[51] Int. Cl.[6] ............... B23K 26/06; G02B 6/32
[52] U.S. Cl. ............... 219/121.6; 219/121.73; 385/31; 385/33
[58] Field of Search ............... 219/121.6, 121.73, 219/121.74; 356/73.1; 385/15, 31, 33

[56] References Cited

U.S. PATENT DOCUMENTS

| | | | |
|---|---|---|---|
| 3,633,126 | 1/1972 | Martin | 372/35 |
| 4,564,736 | 1/1986 | Jones et al. | 219/121.6 |
| 4,676,586 | 6/1987 | Jones et al. | 385/33 |
| 4,681,396 | 7/1987 | Jones | 385/33 |
| 4,732,450 | 3/1988 | Lee | 385/33 |
| 4,747,673 | 5/1988 | Marrs et al. | 359/583 |
| 4,799,755 | 1/1989 | Jones | 219/121.6 |
| 4,864,098 | 9/1989 | Basanese et al. | 219/121.61 |
| 4,927,226 | 5/1990 | Ortiz, Jr. | 219/121.6 |
| 5,044,717 | 9/1991 | Levatter | 385/33 |

FOREIGN PATENT DOCUMENTS

| 4-179992 | 1/1992 | Japan | 219/121.73 |
|---|---|---|---|

*Primary Examiner*—Geoffrey S. Evans
*Attorney, Agent, or Firm*—Tyler Maddry; Marvin Snyder

[57] ABSTRACT

A fresnel reflection termination system includes a laser source, a folding mirror to reflect a laser beam, a focusing lens to focus the laser beam on the folding mirror, and a laser beam dump. The laser beam dump has an outer absorption surface for absorbing fresnel reflections, an inner termination area for capturing fresnel reflections, and a cooling mechanism within the inner termination area for dissipating heat generated by the captured fresnel reflections. The system terminates fresnel reflections to prevent costly damage to the environment or hardware surrounding the system.

22 Claims, 1 Drawing Sheet

FRESNEL REFLECTION TERMINATION SYSTEM FOR HIGH POWERED LASER SYSTEMS

BACKGROUND OF THE INVENTION

This invention relates to a novel fresnel reflection termination system for high powered laser systems. More particularly, said system incorporates a laser beam dump and a cooling means to capture and terminate Fresnel reflections so as to avoid damage to the surrounding environment or hardware.

Laser materials processing as known in the art and as used herein refers to performance of materials processes, such as cutting, welding, drilling and soldering, with a high power continuous wave or pulsed laser beam. The average power of a high power laser beam may range from as little as 1 watt to several hundred watts. A user selects the specific power of the beam on the basis of a particular process being performed.

A laser beam source typically includes a laser head having a crystal, such as a face-pumped laser as described in commonly assigned U.S. Pat. No. 3,633,126, "Multiple Internal Reflection Face-Pumped Laser". The crystal may, for example, have a rectangular cross-sectional shape and have six surfaces including respective pumping and cooling surfaces. Laser crystal flashlamps, sometimes referred to as laser flashlamps, positioned within the laser head and along axes parallel to the pumping surfaces, are regularly utilized as pumping means. The laser flashlamps are coupled to a high energy power supply. The crystal is cooled, for example, by flowing coolant along the crystal surfaces. As is known in the art, the slab crystal has two crystal surfaces which are finished to Brewster's angle. When operating as a laser resonator, a beam to be utilized for processing is emitted from one of the finished crystal surfaces.

Known art describes transmitting a laser beam from a laser source to the vicinity of a workpiece by means of an optical fiber. For example, an apparatus and method for injecting a power laser beam into an optical fiber for transmission there through are described in commonly assigned U.S. Pat. Nos. 4,564,736, 4,676,586, and 4,681, 396, respectively entitled "Industrial Hand Held Laser Tool and Laser System", "Apparatus and Method for Performing Laser Material Processing Through a Fiber Optic", and "High Power Laser Energy Delivery System", the disclosure of each of the before mentioned patents being incorporated in their entirety herein by reference.

Transmitting a laser beam through an optical fiber to an output coupler also is known. Such an apparatus is described in commonly assigned U.S. Pat. No. 4,799,755, entitled "Laser Materials Processing with a Lensless Fiber Optic Output Coupler", the disclosure of which is incorporated in its entirety herein by reference.

Within high powered laser beams (systems of 0.1 kW and above), Fresnel reflections become a problem. This is especially true for laser systems that incorporate optical fiber injection. Such Fresnel reflections have an extremely high frequency, and enough power to burn materials such as plastics, paper, wire, insulation, etc.

Typical power levels from Fresnel reflections range in the order of 4% of the main incident power or 80 Watts for a 2 kW beams and up to 240 Watts for a 6 kW beam. These reflections can cause serious damage to the surrounding hardware and environment if they are not captured and appropriately terminated.

Accordingly, there is a need for an improved high power laser system which would terminate Fresnel reflections thereby preventing costly damage to the environment or hardware surrounding the laser system.

SUMMARY OF THE INVENTION

The above-mentioned needs are met by the present invention which relates to a novel fresnel reflection termination system for high powered laser systems. More particularly, said system incorporates a laser beam dump and a cooling means to capture and terminate Fresnel reflections so as to avoid damage to the surrounding environment or hardware.

The preferred apparatus, according to this invention, offers the following advantages: good economy; ease of use; excellent speed; and termination of Fresnel reflections. In fact, in many of the preferred embodiments, these factors of economy; use; speed and termination of Fresnel reflections, are optimized to an extent considerably higher than heretofore achieved in prior, known high powered laser systems.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
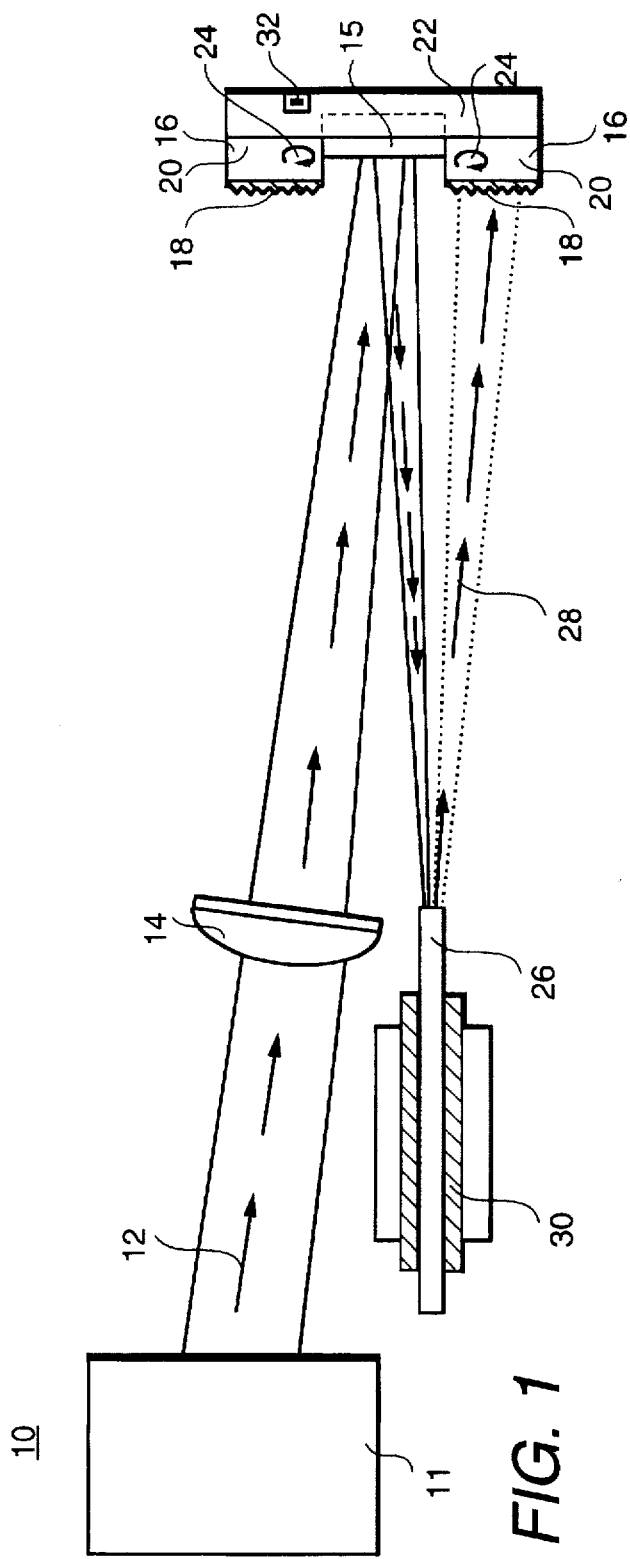
FIG. 1 is a schematic of a high powered laser system having a first embodiment of a novel fresnel reflection termination system therein.

Referring first to FIG. 1 of the drawings, a high powered laser system 10 having a first embodiment of a Fresnel reflection termination system is depicted.

FIG. 1 depicts a laser source 11 producing a laser beam 12 which passes through a focusing means 14, often a focusing lens. Said focusing means 14 directs said laser beam 12 upon a folding mirror 15. Said folding mirror 15 is rigidly positioned within a laser beam dump 16. Said laser beam dump 16 has an outer absorption surface 18 and an inner termination area 20. In a preferred embodiment, said outer absorption surface 18 should be made of anodized aluminum or black anodized copper or a suitable material having a high thermal conductivity. Additionally, the outer absorption surface 18 should have ridges and be black in color, to maximize absorption capabilities.

Further depicted is a beam block 22, which is integral with said laser beam dump 16. Said beam block 22 protects the surrounding environment from potential failure of said folding mirror 15. Said beam block 22 should be made of aluminum or copper, or a suitable material having a high thermal conductivity. Said beam block 22, during a folding mirror 15 failure, would block any beam leakage through said folding mirror. Said laser beam 12 contains enough power to burn paper, plastics, and some metals, therefore, said beam block 22 is important for protecting the surrounding environment.

During absorption, the laser beam generates a significant amount of heat. Therefore, within the inner termination area 20 of said laser beam dump 16, a cooling means 24 dissipates the heat generated by the captured Fresnel reflections 28 through conduction, properly terminating said reflections. In preferred embodiments, said cooling means 24 is circulated water.

Next, said laser beam 12 is reflected from said folding mirror 15 to a prepared optical fiber 26, for injection. The positioning of said optical fiber 26 is carried out by simply adjusting the optical fiber face angle until resulting Fresnel reflections 28 are properly reflected so as to be directed to the outer absorption surface 18 of the laser beam dump. The optical fiber 26, may be positioned using a multi-axis positioner and fiber holder 30. The Fresnel reflections 28 directed upon the outer absorption surface 18 are absorbed by thermal conductivity into the inner termination area 20 of the laser beam dump 16, whereupon said fresnel reflections 28 are properly terminated by said cooling means 24.

Additionally, a photo-detector 32 may be incorporated into the beam block 22 to monitor any laser leakage through said folding mirror 15. Failure of the folding mirror 15 would cause laser leakage to increase dramatically and the photo-detector 32 signal would open an interlock, shutting the laser system down.

Figure 2:
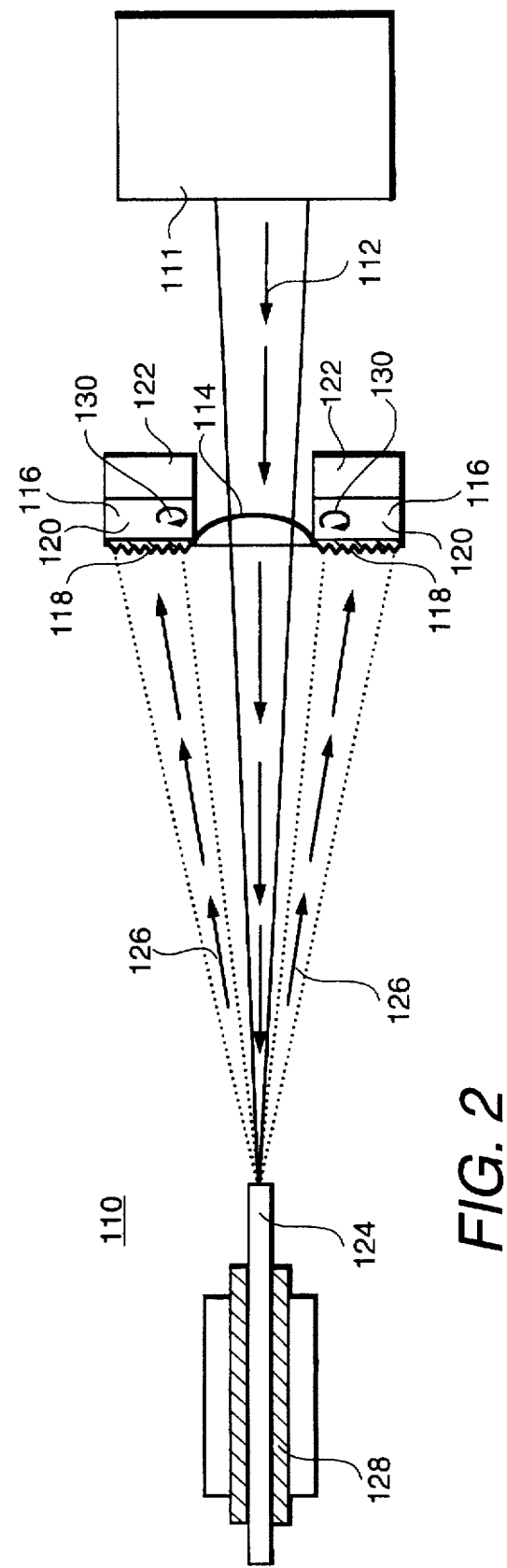
FIG. 2 is a schematic of a high powered laser system having a second embodiment of a novel Fresnel reflection termination system therein.

Referring now to FIG. 2 of the drawings, a high powered laser system 110 having a second embodiment of a Fresnel reflection termination system is depicted. FIG. 2 depicts a laser source 111 producing a laser beam 112 which passes through a focusing means 114, often a focusing lens. Said focusing means 114 directs said laser beam 112 upon a prepared optical fiber 124, for injection. The focusing means 114 is rigidly positioned within a laser beam dump 116. Said laser beam dump 116 has outer absorption surfaces 118 and inner termination areas 120. In a preferred embodiment, said outer absorption surfaces 118 should be made of anodized aluminum or black anodized copper or a suitable material having a high thermal conductivity. Additionally, the outer absorption surface 118 should have ridges and be black in color, to maximize absorption capabilities.

Further depicted are beam blocks 122, which are integral with said laser beam dumps 116. Said beam blocks 122 protect the surrounding environment from potential failure of said laser beam dump 116. Said beam blocks 122 should be made of aluminum or copper, or a suitable material having a high thermal conductivity. Said beam blocks 122, during a beam dump 116 failure, would block any laser beam leakage. The laser beam 112 contains enough power to burn paper, plastics, and some metals, therefore, said beam block 122 is important for protecting the surrounding environment.

The optical fiber 124, may be positioned using a multi-axis positioner and fiber holder 128 so as to direct any resulting Fresnel reflections 126 to the outer absorption surfaces 118 of the laser beam dump 116. The Fresnel reflections 126 directed upon the outer absorption surfaces 118 of the laser beam dump 116 are absorbed into the inner termination area 120 of the laser beam dump 116.

Within the inner termination area 120 of the laser beam dump 116, a cooling means 130 dissipates the heat generated by the captured Fresnel reflections 126, properly terminating them. In preferred embodiments, said cooling means is circulated water.

The foregoing has described several embodiments of a fresnel reflection termination system for high powered laser systems. While specific embodiments of the present invention have been described, it will be apparent to those skilled in the art that various modifications thereto can be made without departing from the spirit and scope of the invention as defined in the appended claims.

What is claimed is:

1. A laser beam dump for termination of fresnel reflections comprising:

redirecting means for redirecting the laser beam;

an outer absorption surface for absorbing fresnel reflections;

an inner termination area for capturing fresnel reflections; and a cooling means within said inner termination area for dissipating heat generated by said captured fresnel reflections.

2. A laser beam dump for termination of fresnel reflections according to claim 1, wherein the redirecting means comprises a mirror.

3. A laser beam dump for termination of fresnel reflections according to claim 1, wherein the redirecting means comprises a focusing lens.

4. A laser beam dump for termination of fresnel reflections according to claim 1, wherein said cooling means for dissipating heat generated by said captured fresnel reflections is circulated water.

5. A method of eliminating fresnel reflections from high powered laser systems using an apparatus comprising: a focusing lens; a laser source; a laser beam dump having an outer absorption surface for absorbing fresnel reflections, an inner termination area for capturing fresnel reflections, and a cooling means for dissipating heat generated by said captured fresnel reflections; and an optical fiber positioned to receive the laser beam and direct any resulting fresnel reflections to said laser beam dump for termination, comprising the following steps:

directing a laser beam produced from said laser source through said focusing lens to said optical fiber; and positioning said optical fiber such that any resulting fresnel reflections are directed to said laser beam dump for termination.

6. A fresnel reflection termination system for high powered laser systems, comprising:

a laser source;

a folding mirror to reflect a laser beam;

a focusing means for focusing a laser beam upon said folding mirror;

a laser beam dump having an outer absorption surface for absorbing fresnel reflections, an inner termination area for capturing fresnel reflections, and a cooling means within said inner termination area for dissipating heat generated by said captured fresnel reflections; and an optical fiber positioned to receive the reflected laser beam from said folding mirror and to direct any resulting fresnel reflections to said laser beam dump for termination.

7. A fresnel reflection termination system for high powered laser systems according to claim 6, further comprising a beam block integral with said laser beam dump.

8. A fresnel reflection termination system for high powered laser systems according to claim 7, wherein said beam block is made of aluminum or copper.

9. A fresnel reflection termination system for high powered laser systems in accordance with claim 6, wherein said focusing means for focusing said laser beam upon said folding mirror is a focusing lens.

10. A fresnel reflection termination system for high powered laser systems in accordance with claim 6, wherein said cooling means for dissipating heat generated by said fresnel reflections is circulated water.

11. A fresnel reflection termination system for high powered laser systems in accordance with claim 6, wherein said optical fiber is positioned using a multi-axis positioner and fiber holder.

12. A fresnel reflection termination system for high powered laser systems in accordance with claim 6, further comprising a photo-detector to monitor any leakage through said folding mirror.

13. A method of eliminating fresnel reflections from high powered laser systems using an apparatus comprising: a laser source; a folding mirror; a focusing lens; a laser beam dump having an outer absorption surface for absorbing fresnel reflections, an inner termination area for capturing fresnel reflections, and a cooling means within the inner termination area for dissipating heat generated by said captured fresnel reflections; and an optical fiber positioned to receive the reflected laser beam from said folding mirror and to direct any resulting fresnel reflections to said laser beam dump, comprising the following steps:

directing a laser beam from said laser source through said focusing lens to said folding mirror; and positioning said optical fiber such that any resulting fresnel reflections are directed to said laser beam dump for termination.

14. A fresnel reflection termination system for high powered laser systems, comprising:

a laser source;

a focusing means for focusing a laser beam upon said optical fiber;

a laser beam dump having an outer absorption surface for absorbing fresnel reflections, an inner termination area for capturing fresnel reflections, and a cooling means for dissipating heat generated by said captured fresnel reflections; and an optical fiber positioned to direct any resulting fresnel reflections to said laser beam dump for termination.

15. A fresnel reflection termination system for high powered laser systems according to claim 14, wherein said focusing means is rigidly positioned within said laser beam dump.

16. A fresnel reflection termination system for high powered laser systems according to claim 14, further comprising a beam block integral with said laser beam dump.

17. A fresnel reflection termination system for high powered laser systems in accordance with claim 14, wherein said focusing means for focusing said laser beam upon said optical fiber is a focusing lens.

18. A fresnel reflection termination system for high powered laser systems in accordance with claim 14, wherein said cooling means for dissipating heat generated by said fresnel reflections is circulated water.

19. A fresnel reflection termination system for high powered laser systems in accordance with claim 14, wherein said optical fiber is positioned using a multi-axis positioner and fiber holder.

20. A laser beam dump for termination of fresnel reflections comprising:

an outer absorption surface for absorbing fresnel reflections, wherein said outer absorption surface has ridges and is black in color;

an inner termination area for capturing fresnel reflections; and a cooling means within said inner termination area for dissipating heat generated by said captured fresnel reflections.

21. A laser beam dump for termination of fresnel reflections according to claim 20, wherein said outer absorption surface is made of anodized aluminum.

22. A laser beam dump for termination of fresnel reflections according to claim 20, wherein said outer absorption surface is made of anodized copper.

* * * * *